June 10, 1969     C. C. SONS, JR     3,448,783
TIRE BEAD SHIELD
Filed June 9, 1967                         Sheet 1 of 2
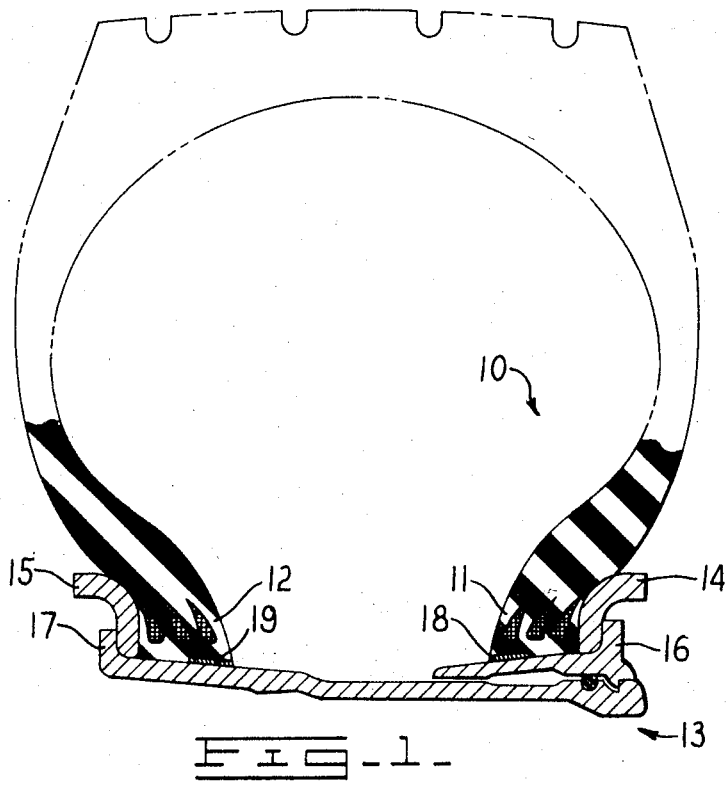
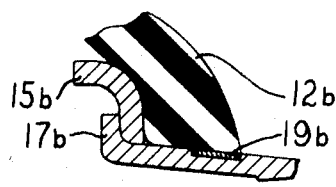     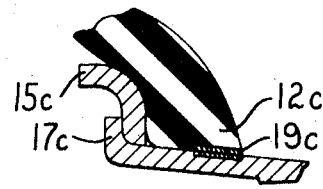
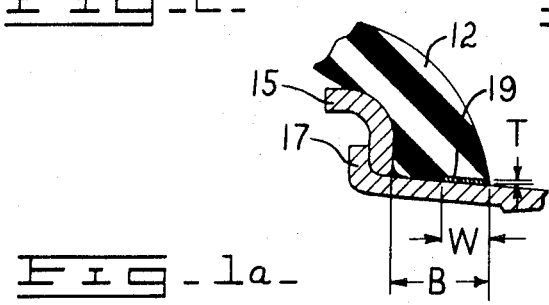
INVENTOR.
CHARLES C. SONS, JR.
BY
ATTORNEYS

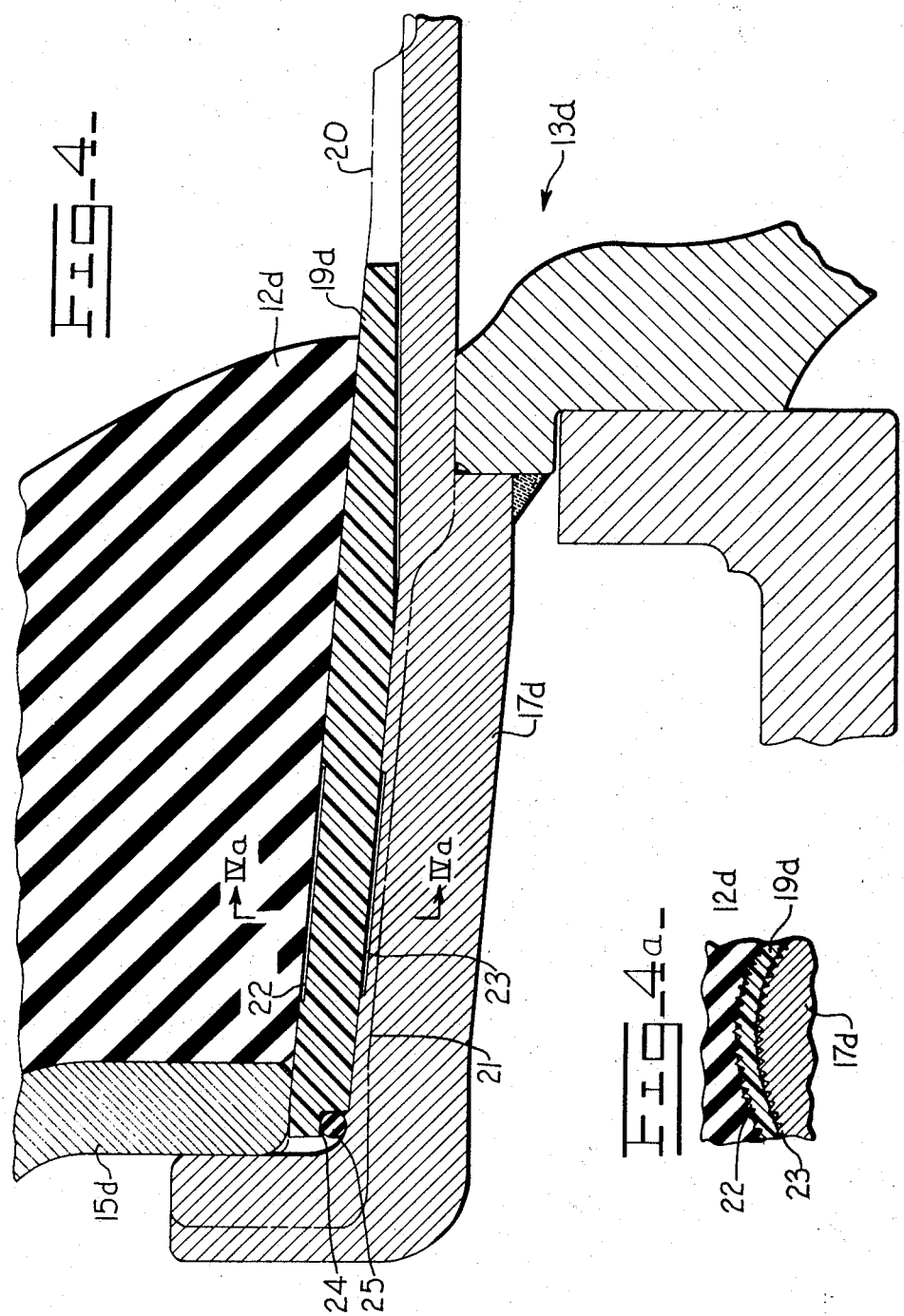

United States Patent Office 3,448,783
Patented June 10, 1969

3,448,783
TIRE BEAD SHIELD
Charles C. Sons, Jr., Peoria, Ill., assignor to Caterpillar Tractor Co., Peoria, Ill., a corporation of California
Continuation-in-part of application Ser. No. 595,477, Nov. 18, 1966. This application June 9, 1967, Ser. No. 659,829
Int. Cl. B60c *15/00, 19/00, 5/16*
U.S. Cl. 152—362             11 Claims

ABSTRACT OF THE DISCLOSURE

A heat shield is constructed and arranged between the rim and tire bead of a ground engaging wheel assembly to protect the tire bead against deterioration.

*Cross-reference to a related application*

This application is a continuation-in-part of applicant's U.S. application Ser. No. 595,477, filed Nov. 18, 1966 for "Tire Bead Shield," now abandoned.

*Background of the invention*

Conventional tires oftentimes deteriorate at the bead thereof, particularly when such tires are subjected to continuous and strenuous use. Such deterioration may be caused primarily by undue heat, created in the wheel assembly during use. Unless inhibited, continued bead deterioration could, of course, rupture the inflated tire. In addition, removal of the tire from its supporting rim proves difficult in many instances since the heat tends to "weld" the tire bead to the rim.

*Summary of the invention*

An object of this invention is to substantially overcome the above briefly described problems by providing shield means constructed and arranged between the tire bead and supporting rim of a ground-engaging wheel assembly to inhibit undue heating of the tire bead to thus protect it against deterioration. The shield means preferably comprises a thin circular strip of material such as a thermoset plastic, exhibiting a low thermal conductivity and a high resistance to decomposition by chemical reactions which may occur in the wheel assembly.

*Brief description of the drawings*

FIG. 1 is a partial cross-sectional view of a wheel assembly employing a first tire bead shield embodiment of this invention;

FIG. 1a is a partial cross-sectional view illustrating preferred design parameters for the tire bead shield of FIG. 1;

FIG. 2 is a partial cross-sectional view illustrating a second tire bead shield embodiment;

FIG. 3 is a partial cross-sectional view illustrating a third tire bead shield embodiment;

FIG. 4 is a partial cross-sectional view illustrating a fourth tire bead shield embodiment; and FIG. 4a is a partial cross-sectional view taken in the direction of arrows 4a—4a in FIG. 4.

*Description of the preferred embodiments*

FIG. 1 partially illustrates a conventional ground-engaging wheel assembly comprising a tire 10 having beads 11 and 12 thereof mounted on the outboard and inboard sides of a metallic rim assembly 13, respectively. The circular rim assembly comprises flanges 14 and 15 mounted on underlying rim base portions 16 and 17, respectively. The top surfaces of the base portions are preferably tapered and arranged to slope towards each other in the manner illustrated to aid in retaining the tire thereon. Such surfaces may be serrated to further aid in the tire driving function.

When the wheel assembly is mounted and operated on an earthmoving vehicle, for example, considerable heat is inherently created adjacent to rim portion 17. The heat may be caused primarily by a conventional service brake and a final wheel drive or planetary gear assembly arranged adjacent to rim portion 17. Unless inhibited, the heat will tend to be conducted through the rim assembly and to the toe portions of beads 11 and 12 to deteriorate them along with the heat inherently generated during flexing of the tire beads.

In addition, conventional tires generally comprise a sulfur constituent which may oxidize at elevated temperatures to form sulfur dioxide and sulfur trioxide. Such oxides will react with moisture to form sulfurous and sulfuric acids which tend to further decompose and deteriorate the tire beads. Thus, in order to protect the tire beads against deterioration, protective shield means are preferably arranged between the toe portions of the beads and the rim assembly.

In the FIG. 1 embodiment, the shield means constitutes shields 18 and 19 adhesively attached, press-fitted or otherwise suitably secured within shallow grooves formed at the toe portions of beads 11 and 12. As illustrated, each shield is maintained substantially flush with respect to a surface of its respective tire bead which is arranged in abutting relationship to the rim assembly. Each of the shields preferably comprises a thin strip of thermoset plastic or other suitable thermal insulator. For example, a phenolic, melamine, silicone or epoxy resin may be so utilized. If desired, the resin could be reinforced with textile or glass fibers to enhance the mechanical properties thereof.

Thermal conductivity, thermal expansion, tensile strength and related design parameters would, of course, be considered by one skilled in the art prior to selecting the material for a particular shield application. The prime design consideration is one of thermal insulation with resistance to chemical decomposition and the like affording secondary considerations. For example, the respective thermal conductivities of a steel rim assembly and various resins and thermoset plastics usable for the shield means would approximate 1500 and from 0.5 to 16 cal./sq. cm. sec. (deg. C./cm.) $\times 10^4$. Thus, it can be seen that a designer skilled in the tire making arts could follow the teachings of this invention and then resort to standard data to readily find the material for a particular shield application to afford the shield predetermined thermal and related physical and chemical properties.

The shields thickness T (FIG. 1a) is preferably selected from a range of from .01 to .125 inch whereas the width W thereof is preferably selected from a range of from 0.25 to 4.0 inches. The circumference of the shield will, of course, substantially equal the circumference of the rim and tire bead for applications wherein it is desired to fully encircle the rim. The bead width for most tires employed in earthmoving applications is from 1 to 6 inches. In certain applications it may prove desirable to extend the shield substantially the full width B of the rim engaging surface of the tire bead.

However, it is preferable in many applications to limit width W to position the shield whereat the greatest amount of heating occurs and to also permit a substantial portion of the tire bead to engage the rim to prevent slippage therebetween. In particular, it is preferable to construct and arrange width W within a range of from one-eighth to one-half of the width B of the tire bead.

FIG. 2 discloses a modification of the heat shield means. In particular, a shield 19b is suitably secured within a shallow groove formed in base portion 17b of the rim.

The shield may be bonded or otherwise fitted into base portion 17b to assume the flush relationship illustrated to thus permit the tire to be changed without disturbing the position of the shield.

FIG. 3 discloses a further modified heat shield means constituting superimposed strips 19c positioned within shallow grooves formed in opposed surface portions of tire bead 12c and base portion 17c of the rim assembly. It can be seen that this embodiment essentially combines the constructions and arrangements of the embodiments disclosed in FIGS. 1 and 2.

As stated above, the heat shield means can be extended in certain applications to cover the full width of the rim engaging surface of the tire bead. This arrangement would be particularly useful in large tire applications. FIG. 4 discloses such a modification wherein a circular shield or strip 19d is constructed and arranged to extend past the toe and heel portions of a tire bead 21d to fully cover same. Although a shield of this type could be arranged in a manner substantially similar to that shown in the embodiments illustrated in FIGS. 1–3, i.e., embedded in either bead 12d or rim portion 17d, the rim assembly is preferably modified in the following manner.

The profile of a conventional rim portion is illustrated in FIG. 4 by phantom lines 20 and 21 and the solid lines appearing therebetween. In large tire applications, it may prove desirable to decrease the inner diameter and decrease the outer diameter of the rim portion to substantially attain the solid line rim configuration 17d. This arrangement strengthens the rim assembly and facilitates the use of relatively large heat shield 19d. In such an application the thickness of the heat shield would be preferably selected from a range of from .25 to .75 inch to provide for adequate thermal insulation.

In addition, the end portion of the shield arranged adjacent to the bead's toe portion is preferably tapered, as illustrated, to facilitate removal of the tire and shield from rim assembly 13d for replacement purposes. Also, serrations could be suitably formed on one or more surfaces of shield 19d, bead 12d and/or rim portion 17d. In the FIG. 4 embodiment, serrations are formed on outer surface portions of the shield and rim at 22 and 23, respectively (FIG. 4a). A notch 24 may be formed in the heel end portion of the shield to retain a sealing means, preferably in the form of a conventional O-ring seal 25, therein to aid in preventing air from escaping from the inflated tire. A flange 15d and rim portion 17d coact to compress the shield and retained seal therebetween.

I claim:

1. In a ground-engaging wheel assembly comprising a pneumatic tire having beads thereof mounted on a rim assembly, the invention comprising a shield means, constituting a heat inhibiting thermoset plastic material the thermal conductivity of which is substantially less than that of said rim assembly, constructed and arranged between at least one of said beads and said rim assembly for inhibiting undue heating of said one bead to prevent deterioration thereof.

2. The invention of claim 1 wherein said shield means comprises a thin circular strip further arranged at a toe portion of said one bead.

3. The invention of claim 1 wherein said shield means is further constructed and arranged within a shallow groove formed within a surface of said one bead which is arranged in abutting relationship to said rim assembly so that said shield means is maintained substantially flush with respect to said surface.

4. The invention of claim 1 wherein said shield means is further constructed and arranged within a shallow groove formed within a surface of said rim assembly which is arranged in abutting relationship with said one bead so that said shield means is maintained substantially flush with respect to said surface.

5. The invention of claim 1 wherein said shield means is further constructed and arranged within shallow grooves formed within abutting surfaces of each of said rim assembly and said one bead.

6. The invention of claim 2 wherein the thickness of said strip is selected from a range of from 0.01 to 0.125 inch and the width thereof is selected from a range of from 0.5 to 6.0 inches.

7. The invention of claim 2 wherein the width of said strip is within a range of from one-eighth to one-half of the width of a surface of said one bead, said surface arranged to abut said rim assembly.

8. The invention of claim 2 wherein said strip is further arranged to terminate at a free edge of said toe portion.

9. The invention of claim 1 wherein said shield means comprises a circular strip further arranged to cover the width of said one bead.

10. The invention of claim 9 wherein an end of said strip adjacent to a toe portion of said one bead is tapered to facilitate removal of said tire from said rim assembly.

11. The invention of claim 9 further comprising sealing means arranged between said strip and said rim assembly adjacent to a heal portion of said one bead for preventing air from escaping from said tire when it is inflated.

References Cited

UNITED STATES PATENTS

| | | | |
|---|---|---|---|
| 1,351,856 | 9/1920 | Lambert | 152—393 |
| 2,028,165 | 1/1936 | Pierce | 152—362 |
| 2,787,312 | 4/1957 | Servaes | 152—362 |
| 2,913,034 | 11/1959 | Wall | 152—366 |

FOREIGN PATENTS

| | | |
|---|---|---|
| 305,533 | 2/1920 | Great Britain. |
| 686,145 | 1/1953 | Great Britain. |

ARTHUR L. LA POINT, *Primary Examiner.*

C. B. LYON, *Assistant Examiner.*

U.S. Cl. X.R.

152—366, 375